B. G. LAMME.
DRIVING SYSTEM FOR GYROSCOPIC STABILIZERS
APPLICATION FILED FEB. 19, 1917.
1,416,038. Patented May 16, 1922.
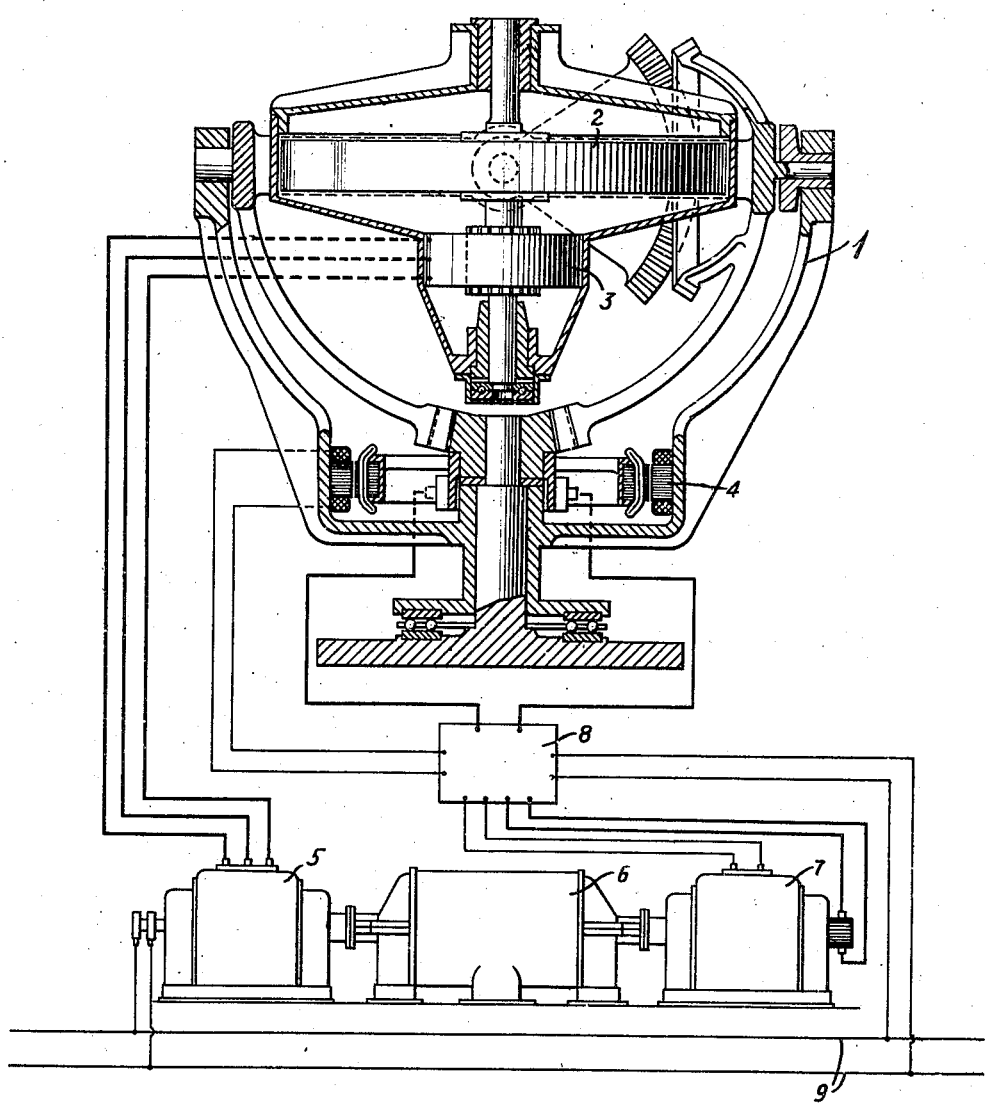
WITNESSES:
Fred. A. Lind.
D. C. Davis
INVENTOR
Benjamin G. Lamme
BY
ATTORNEY

UNITED STATES PATENT OFFICE.

BENJAMIN G. LAMME, OF PITTSBURGH, PENNSYLVANIA, ASSIGNOR TO WESTING-HOUSE ELECTRIC AND MANUFACTURING COMPANY, A CORPORATION OF PENNSYLVANIA.

DRIVING SYSTEM FOR GYROSCOPIC STABILIZERS.

1,416,038.             Specification of Letters Patent.     Patented May 16, 1922.

Application filed February 19, 1917. Serial No. 149,567.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Driving Systems for Gyroscopic Stabilizers, of which the following is a specification.

My invention relates to electrical driving systems for flywheels which are normally employed for other than energy-storage purposes as, for example, for gyroscopic stabilizers, such as are employed to prevent the rolling of ships, and it has for its object to provide a system of the character designated which shall consume a substantially uniform amount of power from a prime mover, thus promoting efficiency and economy in the operation of the entire system.

The single figure of the accompanying drawing is a diagrammatic view of a gyroscopic stabilizer, together with its driving and precession motors and other auxiliary apparatus embodying a preferred form of my invention.

Gyroscopic ship stabilizers have been developed, as shown in U. S. Patent No. 1,150,311, issued to Elmer Sperry on Aug. 17, 1915, wherein a heavy gyroscopic flywheel is driven by a motor, hereinafter to be termed the driving motor, and further equipped with a precession motor for the purpose of periodically forcing the ship back to its desired position by reaction against the gyroscopic flywheel. As said systems have usually been constructed in the past, the driving motor is of relatively small capacity because the friction and windage of the gyroscopic flywheel are reduced to a minimum by the use of ball bearings and of a partially evacuated casing. The precession motor, on the other hand, must be of comparatively large capacity because it must be started periodically, as, for example, every seven seconds, and must accelerate to full speed in, for example, one and one-half seconds, thereafter developing a large amount of energy for a very short period of time. The size of motor demanded has been such that the peak load of all the different motors in a gyroscopic set was two or three times the average load on said motors. It is desirable to operate each stabilizer from a unidirectional generator so as to ensure continuity of operation, irrespective of the main power plant, and it will be readily seen that, with a load having the pronounced peaks above noted, it is necessary either to provide an excessively large generator or to smooth out the peaks by energy-storing means such, for example, as separate flywheels or storage batteries.

It is desirable that the driving motor be of the polyphase induction type for simplicity and ruggedness and it is further desirable that the precession motor be of the direct-current commutator type for rapid starting and for facility of control.

It has been proposed in the past to operate an alternating-current generator from the prime mover and to energize the driving motor directly from said generator. A motor-generator set, comprising an alternating current motor and direct-current generator, was to be interposed between said alternating-current generator and the precession motor for the production of the desired direct current. By associating a flywheel with said motor-generator set, the load peaks of the precession motors may be smoothed out, as is usual in rolling-mill and hoisting practice. It will be noted that the system thus proposed is expensive and embodies many heavy pieces, the latter disadvantage being of considerable moment on ship-board where the saving of space and weight is an important item. I accordingly simplify and cheapen the above system by employing the gyroscopic flywheel itself as the energy-storing and restoring device and I produce the direct current desired for the precession motor from a direct-current generator mechanically connected to the alternating-current generator and to the prime mover. The induction-type driving motor serves as a substantially rigid driving connection between the gyroscopic flywheel and the alternating-current generator and, when a peak in the load on the precession motors is encountered, energy is received from the gyroscopic flywheel and is transmitted through the alternating-current generator to the direct-current generator for supply to the precession motors.

For a more detailed understanding of my invention, attention is directed to the drawing, wherein I show a gyroscopic stabilizer at 1, said stabilizer embodying a flywheel 2, a driving motor 3 of the induction type mechanically coupled thereto and a precession motor 4 arranged to provide the desired precession effect in any desired member, as disclosed in the aforementioned Sperry patent. Energy for the operation of the driving motor 3 is derived from a polyphase alternating-current generator 5 which is driven by a suitable prime mover 6 such, for example, as a steam turbine. A direct-current generator 7 is coupled to the shaft of the prime mover 6 and is arranged to intermittently supply energy to the precession motor 4 through a suitable automatic precession-control device indicated at 8. Not only may the main power leads traverse the precession control device but the field circuits of direct-current machines may also be controlled thereby, thus promoting economy in the field excitation while, at the same time, obtaining an extremely flexible speed control. Energy for the excitation of the generator 5 and of the different direct-current machines may be derived from any suitable source such, for example, as an exciter bus 9.

Having thus described the arrangement of a system embodying my invention, the operation thereof is as follows. Let it be assumed that the flywheel 2 has been brought up to speed and that the friction and windage losses thereof are being supplied by the induction motor 3, operating from the alternating-current generator 5 which, in turn, is driven by the prime mover 6. The precession-control device 8 now operates to energize the precession motor 4, creating a temporary load peak. A portion of said load peak is overcome by the inertia of the moving parts of the three machines 5, 6 and 7, producing a perceptible reduction in the speed thereof and, consequently, reducing the frequency of the generator 5. The flywheel 2, continuing to rotate at substantially constant speed, causes the induction machine 3 to be driven at such speed that its frequency tends to exceed that of the generator 5. The motor 3 thereupon becomes an asynchronous generator, deriving excitation from the generator 5 and supplying energy to said generator which temporarily produces a much reduced generator action, leaving the prime mover 6 free for driving the direct-current generator 7, or said alternating-current generator 5 may even act as a motor, aiding in driving the generator 7. In this manner, the driving torque upon the flywheel may be temporarily removed, permitting all the energy of the prime mover to go to the precession motor, or energy may be actually absorbed from the flywheel to still further augment the energy input to the precession motor. Upon the cessation of the peak load of the precession motor, normal conditions are resumed, the alternating-current generator 5 again absorbing power from the prime mover 6 and, in turn, driving the induction motor 3 not only so as to supply the friction and windage losses to the flywheel 2 but also to slightly accelerate said flywheel to return thereto the energy absorbed during the peak load on the precession motor.

I have illustrated my invention in connection with the flywheel of a gyroscopic ship stabilizer but I desire it to be distinctly understood that I contemplate its use in connection with flywheels employed for any purpose whatsoever other than mere energy storage as, for example, in connection with naval fire control.

While I have shown my invention in its preferred form, it will be obvious to those skilled in the art that it is not so limited but is susceptible of various minor alterations and changes without departing from the spirit thereof and I desire, therefore, that only such limitations shall be placed thereupon as are imposed by the prior art or as are specifically set forth in the appended claims.

I claim as my invention:

1. The combination with a flywheel, of an alternating-current dynamo-electric machine for driving the same, said machine being adapted to operate also as a generator absorbing energy from the flywheel, a variable-power electrical load device, a common source of energy for said machine and said device, and means for automatically causing energy to be transferred from said flywheel to said source during periods of maximum power-consumption.

2. The combination with a flywheel, of an alternating-current dynamo-electric machine for driving the same, said machine being adapted to operate also as a generator absorbing energy from the flywheel, a substantially synchronously running, alternating-current generator electrically connected to said machine, a variable-power electrical load device, a common source of energy for said machine and said device, and means for automatically causing energy to be transferred from said flywheel to said source during periods of maximum power-consumption.

3. The combination with an electric generator, a variable load therefor, a prime-mover therefor, said prime-mover having a falling speed-torque characteristic, a flywheel, an induction motor driving the same, and means for supplying said motor with electrical energy from said prime-mover, the frequency of the electrical energy supplied to said motor being dependent upon the speed of said prime-mover, whereby said motor operates as a generator during maximum-load conditions.

4. The combination with an electric generator, a variable load therefor, a prime-mover therefor, said prime-mover having a falling speed-torque characteristic, a flywheel, an induction motor driving the same, and an auxiliary synchronous alternating-current generator mechanically connected to said prime-mover and electrically connected to said motor, whereby the direction of energy-flow between said auxiliary generator and said motor is reversed during maximum-load conditions.

5. The combination with a direct-current driving motor subject to frequent starting, of a generator for energizing the same, a prime-mover for driving said generator, said prime-mover having a drooping speed-torque characteristic, an auxiliary dynamo-electric machine mechanically connected to said prime-mover and developing alternating-current energy of a frequency proportional to the speed of said prime-mover, a flywheel, and a second alternating-current machine mechanically connected to said flywheel and adapted to interchange energy with said auxiliary machine, the direction of energy flow being dependent upon the speed of said prime-mover.

6. The combination with a direct-current driving motor subject to frequent startings, of a generator for energizing the same, a prime-mover for driving said generator, said prime-mover having a drooping speed-torque characteristic, an auxiliary dynamo-electric machine mechanically connected to said prime-mover and developing alternating-current energy of a frequency proportional to the speed of said prime-mover, a flywheel, a partially evacuated casing for said flywheel, and an induction motor mechanically connected to said flywheel and electrically connected to said auxiliary machine.

7. The combination with the flywheel of a a gyroscopic stabilizer, of a substantially synchronously-running alternating-current driving motor therefor, a precession motor therefor which is intermittently active, and means whereby, when said precession motor is active, the driving effect of said driving motor is materially lessened.

8. The combination with the flywheel of a gyroscopic stabilizer, of an induction motor driving means therefor, a precession motor therefor which is intermittently active, and means whereby, when said precession motor is active, said driving motor reverses in function, absorbing energy from said flywheel and transmitting said energy to said precession motor.

9. The combination with the flywheel of a gyroscopic stabilizer, of an induction-motor driving means therefor, a precession motor therefor which is intermittently active, a prime mover having a falling speed-torque characteristic, and generating means coupled thereto and connected to said motors, the generating means coupled to said induction-motor driving means having a frequency dependent upon the speed of said prime mover.

10. The combination with the flywheel of a gyroscopic stabilizer, of an alternating-current driving motor therefor, an intermittently active, direct-current, precession motor associated therewith, supply systems for said motors, and means for energy transfer between said systems, whereby, when said precession motor is active, said driving motor reverses in function and energy is absorbed from said flywheel and transmitted to the direct-current supply system for aiding in the energization of said precession motor.

11. The combination with the flywheel of a gyroscopic stabilizer, of an alternating-current driving motor therefor, an intermittently active, direct-current, precession motor associated therewith, a prime mover, an alternating-current generator and a direct-current generator coupled to said prime mover, and connections from said alternating-current generator to said driving motor and from said direct-current generator to said precession motor, whereby, when said precession motor is active, said prime mover is reduced in speed, materially reducing the driving effect of said driving motor and causing substantially all the energy of said prime mover to be transmitted to said precession motor.

12. The combination with the flywheel of a gyroscopic stabilizer, of an alternating-current driving motor therefor, an intermittently active, direct-current, precession motor associated therewith, a prime mover, an alternating-current generator and a direct-current generator coupled to said prime mover, and connections from said alternating-current generator to said driving motor and from said direct-current generator to said precession motor, whereby, when said precession motor is active, said prime mover is reduced in speed and said driving motor is caused to act as a generator, deriving energy from said flywheel and transmitting said energy through said alternating-current generator, acting as a motor, to said direct-current generator for supply to said direct-current motor.

13. The combination with the flywheel of a gyroscopic stabilizer, of a driving motor of the alternating-current, induction type therefor, an intermittently active, direct-current, precession motor associated therewith, a prime mover, an alternating-current generator and a direct-current generator coupled to said prime mover, and connections from said alternating-current generator to said driving motor and from said direct-current generator to said precession motor, whereby, when said precession motor is active, said prime mover is reduced in speed, materially reducing the driving effect of said driving motor and causing substantially all the energy of said prime mover to be transmitted to said precession motor.

14. The combination with the flywheel of a gyroscopic stabilizer, of a driving motor of the alternating-current, induction type therefor, an intermittently active, direct-current, precession motor associated therewith, a prime mover, an alternating-current generator and a direct-current generator coupled to said prime mover, and connections from said alternating-current generator to said driving motor and from said direct-current generator to said precession motor, whereby, when said precession motor is active, said prime mover is reduced in speed and said driving motor is caused to act as a generator, deriving energy from said flywheel and transmitting said energy through said alternating-current generator, acting as a motor, to said direct-current generator for supply to said direct-current motor.

15. The combination with the moving flywheel of a gyroscopic stabilizer, of a substantially constant-speed induction motor spinning said flywheel, an alternating-current generator supplying said induction motor, means mechanically associated with said generator for supplying direct current, and a direct-current precession motor adapted to be connected thereto, said motors and generators adapted either to absorb or to deliver energy in such manner as to utilize said flywheel to equalize the total energy of the system over a complete cycle of operation.

In testimony whereof, I have hereunto subscribed my name this 31st day of January, 1917.

BENJ. G. LAMME.